US006331194B1

(12) United States Patent
Sampayan et al.

(10) Patent No.: US 6,331,194 B1
(45) **Date of Patent: *Dec. 18, 2001**

(54) PROCESS FOR MANUFACTURING HOLLOW FUSED-SILICA INSULATOR CYLINDER

(75) Inventors: Stephen E. Sampayan, Manteca, CA (US); Michael L. Krogh; Steven C. Davis, both of Lee's Summit, MO (US); Derek E. Decker, Discovery Bay, CA (US); Ben Z. Rosenblum, Overland Park, KS (US); David M. Sanders, Livermore, CA (US); Juan M. Elizondo-Decanini, Albuquerque, NM (US)

(73) Assignee: The United States of America as represented by the United States Department of Energy, Washington, DC (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/889,587

(22) Filed: Jul. 8, 1997

Related U.S. Application Data

(63) Continuation-in-part of application No. 08/688,669, filed on Jun. 25, 1996, now Pat. No. 5,821,705, and a continuation-in-part of application No. 08/773,504, filed on Dec. 18, 1996, now Pat. No. 5,811,944.

(60) Provisional application No. 60/031,683, filed on Nov. 22, 1996, and provisional application No. 60/035,463, filed on Jan. 14, 1997.

(51) Int. Cl.[7] .......................... H01G 9/00
(52) U.S. Cl. .......................... 29/25.03; 438/396
(58) Field of Search .......................... 29/25.03; 439/396, 439/FOR 430

(56) References Cited

U.S. PATENT DOCUMENTS 3,686,539 * 8/1972 Schwartzman .
3,753,511 * 8/1973 Noren .
5,003,827 * 4/1991 Kalinoski et al. .
5,322,798 * 6/1994 Sadowski .
5,355,247 * 10/1994 Byer et al. .
5,811,944 * 9/1998 Sampayan et al. .
5,821,705 * 10/1998 Caporaso et al. .

* cited by examiner

*Primary Examiner*—David E. Graybill
(74) *Attorney, Agent, or Firm*—William C. Daubenspeck; Virginia B. Caress; Paul A. Gottlieb

(57) ABSTRACT

A method for building hollow insulator cylinders that can have each end closed off with a high voltage electrode to contain a vacuum. A series of fused-silica round flat plates are fabricated with a large central hole and equal inside and outside diameters. The thickness of each is related to the electron orbit diameter of electrons that escape the material surface, loop, and return back. Electrons in such electron orbits can support avalanche mechanisms that result in surface flashover. For example, the thickness of each of the fused-silica round flat plates is about 0.5 millimeter. In general, the thinner the better. Metal, such as gold, is deposited onto each top and bottom surface of the fused-silica round flat plates using chemical vapor deposition (CVD). Eutectic metals can also be used with one alloy constituent on the top and the other on the bottom. The CVD, or a separate diffusion step, can be used to defuse the deposited metal deep into each fused-silica round flat plate. The conductive layer may also be applied by ion implantation or gas diffusion into the surface. The resulting structure may then be fused together into an insulator stack. The coated plates are aligned and then stacked, head-to-toe. Such stack is heated and pressed together enough to cause the metal interfaces to fuse, e.g., by welding, brazing or eutectic bonding. Such fusing is preferably complete enough to maintain a vacuum within the inner core of the assembled structure. A hollow cylinder structure results that can be used as a core liner in a dielectric wall accelerator and as a vacuum envelope for a vacuum tube device where the voltage gradients exceed 150 kV/cm.

13 Claims, 7 Drawing Sheets

PROCESS FOR MANUFACTURING HOLLOW FUSED-SILICA INSULATOR CYLINDER

COPENDING APPLICATIONS

This application is a Continuation in Part of U.S. patent application, Ser. No. 08/688,669, filed Jun. 25, 1996 for "IMPROVED DIELECTRIC-WALL LINEAR ACCELERATOR", now U.S. Pat. No. 5,821,705, and U.S. patent application Ser. No. 08/773,804, filed Dec. 18, 1996 for "ENHANCED DIELECTRIC WALL ACCELERATOR", now U.S. Pat. No. 5,811,944, and Provisional U.S. patent application serial No. 60/031,683, filed Nov. 22, 1996, for "HIGH-GRADIENT HARD-SEAL INSULATOR"; and Provisional U.S. Patent Application serial No. 60/035,463, filed Jan. 14, 1997 for "HIGH GRADIENT INSULATOR CAVITY MODE FILTER". All such applications are incorporated herein by reference.

NOTICE

The United States Government has rights in this invention pursuant to Contract No. W-7405-ENG-48 between the United States Department of Energy and the University of California for the operation of Lawrence Livermore National Laboratory, and pursuant to Contract No. DE-AC04-76-DP00613 between the United States Department of Energy and Allied Signal Corporation for the operation of its Kansas City Division.

BACKGROUND OF THE INVENTION

1. Field of the Invention

The present invention relates to insulator and dielectric material fabrication and more particularly to layered stacks of alternating bulk insulators and foil-like conductors, and bulk insulators with half-buried parallel rows of conductors, that exhibit very high voltage surface breakdown characteristics, and further to the diffusion braze furnace and optical photoresist deposition, irradiation and development methods for fabricating such structures.

2. Description of Related Art

Glass, ceramic, and other such materials are universally relied on as insulator materials in high voltage systems. But such materials allow the insulators they are used in to be damaged by avalanche and flashovers that occur when the insulator has been subjected to a voltage over-stressing. Fine tracks can develop that lower the insulator's breakdown voltage to successive exposures to stress voltages. Conventional bulk material insulators also tend to be very large, and the systems that incorporate them must necessarily provide enough room to accommodate them.

Many electronic devices depend on a pair of opposing high voltage electrodes contained in a vacuum. Antique vacuum tubes were once used in radios and TV's and comprised glass envelopes in which were disposed at least one cathode and anode. More complex vacuum tubes had one or more grids and control screens placed between the cathode and anode to control the plate current. Usually the plate voltages used did not exceed 200–300 volts, and so the cathode and anode connections could all be brought out together in a single base. But glass envelope surface flashover can occur with vacuum tube devices that use plate voltages over 100 kV. Some neutron tubes need to operate at well over 200 kV across an insulator only a few centimeters long.

Conventional dielectric materials for vacuum tube devices, capacitors, accelerators, and other high-voltage applications are typically made from glass, ceramics and other metal oxides, polymers, or other common bulk materials. Simple homogenized mixtures of such materials are also conventional. Polymer films used as dielectric layers and dielectric mixtures spread over a conductive surface are common ways to fabricate capacitors.

A widely held view of the process by which an insulator-vacuum interface breaks-down contends that there is an enhancement of the electric field at triple points, e.g., points where there is an intersection of a vacuum, a solid insulator and an electrode. Electrons that are field emitted from a triple point on a cathode initially drift in the electric field between the end plates of the insulator which is a dielectric and is polarized when the emitted electrons impact the surface and knock loose additional electrons in a kind of chain reaction. This results in an electric field which further attracts additional electrons into the surface of the insulator. The electron collisions with the surface can liberate a greater number of electrons than originally collided with the surface, depending upon the electron energy of the collisions. This can lead to a catastrophic event in which the emission of these electrons further charges the insulator surface, leads to more collisions with the surface, and the release of even more electrons. This growing electron bombardment desorbs gas molecules that are stuck to the insulator surface and ionizes them, creating a dense plasma which then electrically shorts out the surface of the insulator between the electrodes, e.g., secondary electron emission avalanche (SEEA).

The scale length for the electron hopping distance along a conventional insulator's surface can be on the order of a fraction of a millimeter to several millimeters. When isolated conductive lamination layers are alternated with insulator lamination layers, SEEA current is prevented such that no current amplification can take place. The electron current amplification due to secondary emission is stopped when the electrode spacing is comparable to the electron hopping distance. Direct bombardment of the surface by charged particles or photons can still liberate electrons from the insulator, but the current will not avalanche. Surface breakdown then requires the bombardment by charged particles or photons that is so intense that adsorbed gas is ionized or enough gas is released from the surface that an avalanche breakdown in the gas occur between the plates.

The microstack was assumed to act as a capacitive voltage divider, and the voltage between layers was assumed to be a constant on the time scale of streamer creation. Such microstack insulators were designed for specific pulse periods and for known residue gases in a system. Conductors such as copper and tungsten were either too soft or too hard, and dielectrics such as NYLON, TEFLON, and LEXAN (polycarbonate) were too unstable or melted during fabrication with a loose preassembled stack that was hydraulically pressed into a solid laminate block. So samples were made with 0.010" sheets of MYLAR and stainless steel in conical stacks that were cured by twenty-hours of heating and then surface polished.

Some of the present inventors participated as authors in the preparation of a paper titled, "High Gradient Insulator Technology for the Dielectric Wall Accelerator", for the 1995 Particle Accelerator Conference and International Conference of High-Energy Accelerators, May 1–5, 1995, in Dallas, Tex. Such paper mentions that insulators composed of finely spaced alternating layers of dielectric and metal are thought to minimize secondary electron emission avalanche (SEEA) growth. The structure was not described further, nor was the fabrication method used to produce high gradient insulators mentioned. In the published test results, pulses of 1.3 $\mu$S and up to 250 K volts were applied to small samples that included substrates of polycarbonate, fused silica, and alumina. A similar scenario was used to test the flashover strength of a high gradient insulator. The test results reported indicated that a 1× to 4× increase in the breakdown electric field stress is possible with this technology.

Prior art insulator structures and methods have proven to be impractical to use in the fabrication of certain vacuum barrier walls and envelopes, especially in microminiaturized systems.

SUMMARY OF THE INVENTION

An object of the present invention is to provide a high gradient insulator with a hard seal characteristic suitable for vacuum applications.

A further object of the present invention is to provide an insulator with very high breakdown voltage that permits vacuum tube device microminiaturization.

A still further object of the present invention is to provide a method for fabricating high gradient hard seal insulator structures from stacks of metalized flat annular dielectric substrate rings.

Another object of the present invention is to provide a method for fabricating high gradient hard seal insulator structures with inlaid parallel rows of metal in the surface of dielectric substrates.

Briefly, a method embodiment of the present invention comprises fabricating a hollow insulator cylinder that can have each end closed off with a high voltage electrode to contain a vacuum. A series of fused-silica plates are fabricated from quartz and ground flat to simplify later stacking and bonding. The thickness of each of the fused-silica round flat plates is targeted to be about 0.25 millimeter. An adhesion layer of about 5,000 Å of chromium is sputter deposited onto each top and bottom surface of each of the fused-silica round flat plates. A 25,000 Å–35,000 Å layer of gold is next deposited on the chromium adhesion layer, to prohibit oxidation and to provide enough material to level imperfections in the surface. An alloy of gold and chromium forms at the interface. Once the gold is deposited, the metallized plates can be exposed to air. The metalized plates are aligned and then stacked in a diffusion braze furnace. About one to two pounds per square inch of pressure is applied to the stack and heated to 900° C. for two hours, enough to cause diffusion bonding of the gold on one plate to the gold on an adjacent plate. Such bonding between the metallized plates is preferably complete enough to allow the maintenance of a vacuum within the inner core of an assembled structure that uses the high gradient insulator as a vacuum envelope. An ultrasonic abrasive drill is used to hollow out the inside and carve the outside wall of a right cylinder. The layers of insulators and conductors thereafter lie in planes perpendicular to the axis of the cylinder. The hollow cylinder structure that results can then be then used as a vacuum envelope for a vacuum tube device where the voltage gradients exceed 150 kV/cm (15 MV/m) between the anode and cathode. Further improvements in the gradient can be obtained by lapping the inside and outside diameters of the insulators.

An advantage of the present invention is an insulator is provided for space-constrained applications with very high voltage gradients.

Another advantage of the present invention is a high gradient insulator is provided for vacuum tubes.

A further advantage of the present invention is a dielectric is provided in which exceeding the breakdown voltage rating causes only temporary and not permanent damage and operational interruptions.

A still further advantage of the present invention is an method is provided for fabricating high gradient hard seal insulators.

DETAILED DESCRIPTION OF THE INVENTION

Figure 1:
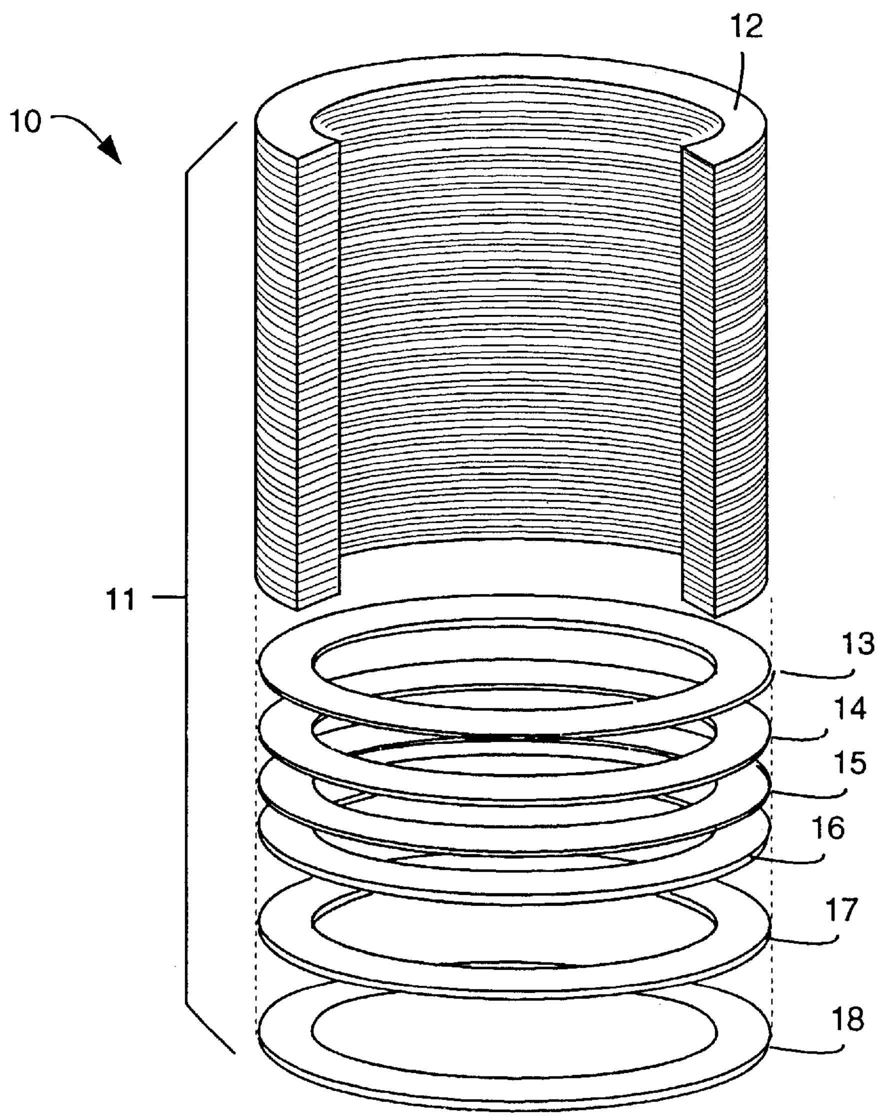
FIG. 1 is a cutaway perspective view and exploded assembly diagram of a hollow cylindrical high gradient insulator embodiment of the present invention made of a fused stack of metalized flat annular dielectric rings.

FIG. 1 shows a hollow cylindrical high gradient insulator (HGI) embodiment of the present invention, and is referred to herein by the general reference numeral 10. The HGI 10 is made of a fused stack 11 of metalized flat annular dielectric rings. For example, the thickness of each of the fused-silica round flat plates is about 0.5 millimeter. In general, the thinner the better. Metals, such as chromium followed by gold, are evaporated onto each top and bottom surface of the fused-silica round flat plates using chemical vapor deposition (CVD). A cylinder is cut from a stack of such plates after bonding them together. A segment 12 represents such rings already assembled, and a series of rings 13–18 are shown being grouped together for final assembly, e.g., by diffusion bonding. Such HGI 10 has directional electrical characteristics, it acts as an insulator only in the orthogonal axis normal to the parallel planes of the conductive layers.

Each ring 13–18 may alternatively be comprised of quartz or silica glass, alumina, or sapphire bulk insulator material semiconductor doped. Materials suggested by the prior art, such as polycarbonate or acrylic, are avoided because they tend to pollute any vacuum they might contain and are difficult to seal together with metal interlayers against a vacuum. Each ring 13–18 has a metal deposition on both faces that do not connect together at either the inside or outside perimeters. And each ring 13–18 is preferably 100–500 $\mu$m, and preferably under 0.25 mm thick. Each ring 13–18 is therefore the equivalent of a thin high voltage capacitor, and the stack of flat rings 13–18 constitutes a capacitive voltage divider. A stack 2.5 cm high would have more than 100 such capacitors in series. At a gradient of 15 MV/m, or 15 kV/mm, each capacitor has no more than 3.5 kV applied across it. Should any one of such capacitors be defective or get damaged by a surface flashover or bulk breakdown, the voltage applied across the whole stack will be reapportioned across the remaining capacitors.

The maximum insulator characteristic, and especially resistance to surface flashover, is achieved when the applied electric field traverses perpendicular to the laminate structure. Since the metalizations on each stacked quartz ring run through from the inside to the outside, electric fields, and especially direct current, applied in line with the laminate structure will find a low impedance metal conductor through the bulk of the HGI 10. For example, an electron current flowing between electrodes in opposite ends of a vacuum evacuated quartz glass HGI 10 cylinder, can find a path through an intermediate conductive foil in the wall to the outside.

In the radial direction, energetic radiation, especially microwave energy, is low-pass filtered when it passes between the inside and outside of HGI 10. At very high frequencies, the inductive reactances of the individual radial paths on the ring conductors becomes significant. Similarly, the capacitor formed by each pair of ring conductors and intervening dielectric exhibits significant capacitive reactance. Together, the electrical equivalent is a pi-filter with parallel capacitor inputs and outputs and a series inductance.

Such effect is useful in induction type linear accelerators in which spurious harmonic energy can cause the charged particle beam to waggle, the so-called "beam breakup instability". The high gradient insulators of the present invention can be used to decrease the acceleration gap length between cell stages and thus cure the problem without suffering arcing between cell stages. A strong voltage reversal in this gap needs to be controlled. In particular, insulator to metal ratios of 4:1 to 1:1 were effective in reducing the transverse impedance (Ztr, in ohms per meter) for frequencies between 1.3 GHz and 1.5 GHz. A ratio of 1:1 was maximally effective.

A conclusive theory which fully explains why such a superior surface flashover characteristic is achieved by HGI 10 has yet to be presented. It is believed, however, that the increased breakdown electric field these structures exhibit may separately, or in combination, result from minimized secondary avalanche (SEEA) growth, shielding of the insulator from the effects of charging, or result from a modification of the statistical nature of the breakdown process by separating the macro-structure into its constituent substructures. The macro-structures can sustain electric fields one and a half to four times that of a similar conventional single substrate insulator. The present inventors have tested the structures under various pulse conditions, in the presence of a cathode and electron beam, and under the influence of intense optical illumination. On-going studies are being made to investigate the degradation of the breakdown electric field resulting from alternate fabrication techniques, the effect of gas pressure, and the effect of the insulator-to-electrode interface gap spacings.

In one embodiment of the present invention, the high gradient insulator consists of finely spaced metal electrode foils laminated parallel to one another within the insulator substrate. The spacings of these metal electrodes is preferably on the order of a streamer formation distance. The wall angle of the surface of the dielectric separators is another independent variable that can control surface flashover. In tests, a 350% improvement over conventional straight wall (0°) insulators was observed. Slanted walls, e.g., coning a cylindrical high gradient insulator, have also shown further resistance to surface flashover. The susceptibility of such insulators to breakdown has been tested under various conditions. These conditions include the effect of surface roughness resulting from different fabrication techniques, the effect of gas pressure, and the effect of the insulator to electrode interface spacing. Such structures have been tested in the presence of an ion beam and various other radiation fields. The observations to date are still somewhat qualitative, but indicate that an impacting ion beam will not induce an immediate and prompt breakdown. Rather, a somewhat reduced breakdown of the electric field on the structure has been noted.

Some experiments indicate that it may be advantageous, in terms of surface flashover suppression, to angle the longitudinal run of one or both of the opposite surface faces of the dielectric material intermediate to each conductor plane at about 55°. Such angle is related to and constrained by the angle of surface emissions of electrons of highly stressed insulators. Flashover and avalanche phenomena seem to depend on such emitted electrons to seed a surface breakdown. So interfering with this mechanism can extend the ultimate flashover voltage still higher.

Figure 2B:
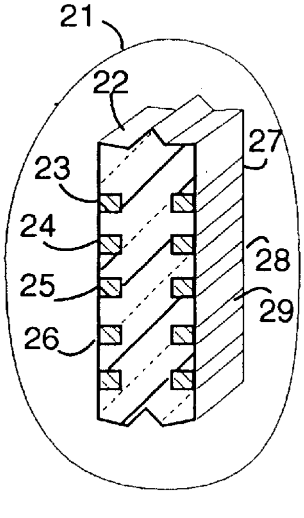
FIG. 2B is a cutaway view of a part of the wall of the hollow cylindrical high gradient insulator of FIG. 2A and shows how the quartz wall is inlaid both inside and outside with metal flush to the respective surfaces.
Figure 2A:
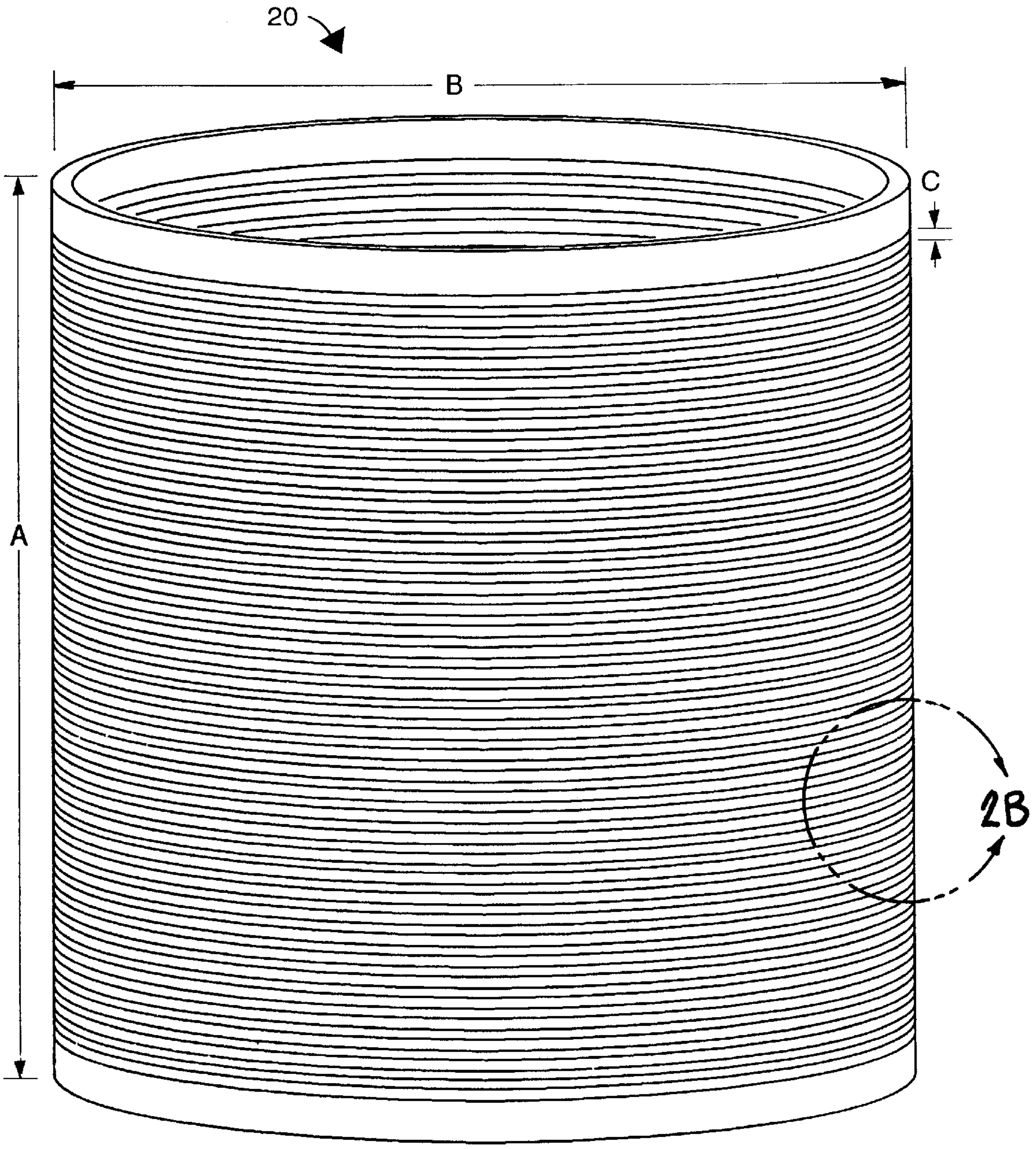
FIG. 2A is a perspective view of a hollow cylindrical high gradient insulator embodiment of the present invention made of a single hollow cylindrical piece of quartz with parallel trenches filled with metal on both the inside and outside surfaces.

FIG. 2A shows a hollow cylindrical high gradient insulator embodiment of the present invention, and is referred to herein by the general reference numeral 20. The HGI 20 includes a single hollow cylindrical piece of dielectric material with parallel circular-ring trenches filled with metal on both the inside and outside surfaces. The period of such rings on the surface is preferably on the order of 1–1000 micrometers, and the ratio of the longitudinal metal surface to the longitudinal dielectric surface is preferably in the range of 5% to 95%. Recent test indicate that longitudinal ring periods of less than 250 micrometers provide better surface flashover characteristics than does making such periods in excess of 250 micrometers.

FIG. 2B shows a part of a wall 21 of the HGI 20. A quartz, sapphire, or alumina wall segment 22 has both inside parallel metal rings 23–26 and outside parallel metal rings 27–29 that are, in at least one embodiment, flush at their tops to the respective surrounding dielectric material surfaces. Therefore, unlike the metal rings of HGI 10, the metal rings of the HGI 20 do not extend all the way through. So the vacuum integrity of a vacuum tube using the HGI 20 would be easier to maintain, and electrical currents through the walls would not be supported. In alternative embodiments, the depth of penetration of rings 23–29 into the dielectric wall 22, and/or their extension from the surface, may be adjusted to suit particular applications.

In both HGI 10 and HGI 20, it may be advantageous to apply to the inner and/or outer surfaces a field emission suppression coating, a secondary suppression material, or a thin resistive, e.g., semi-conductive, coating. Conventional deposition means and materials may be used.

Figure 3:
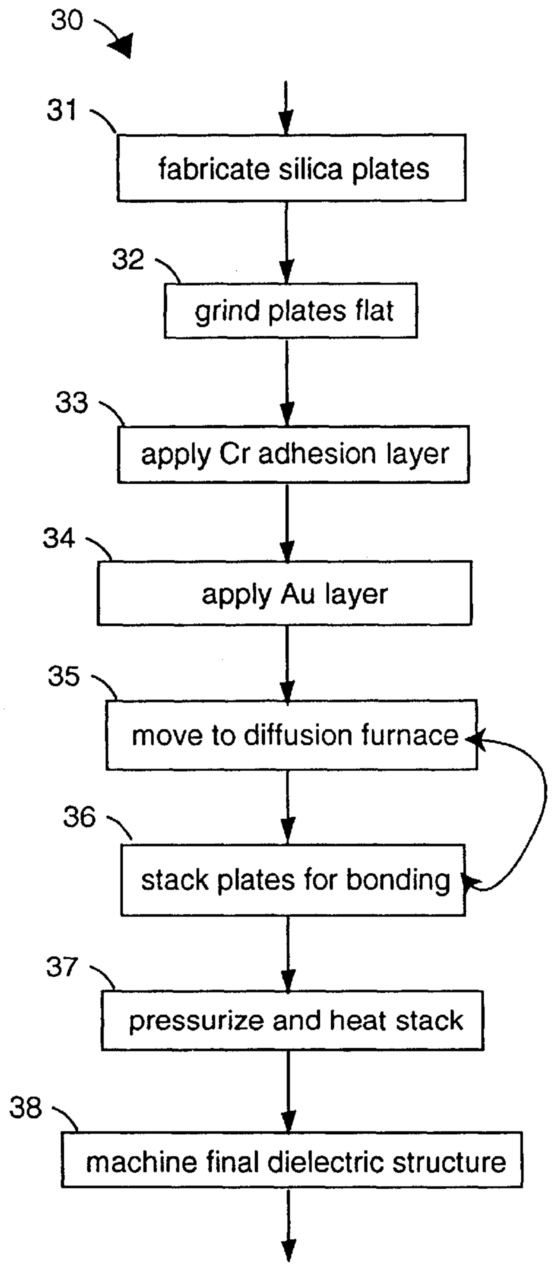
FIG. 3 is a flowchart of a method embodiment of the present invention for fabricating high gradient insulator structures such as that shown in FIG. 1.

FIG. 3 shows a method embodiment of the present invention for fabricating high gradient insulator structures such as that shown in FIG. 1, and the method is referred to herein by the general reference numeral 30.

The method 30 comprises a step 31 in which a number of flat thin fused-silica plates are fabricated from silicon dioxide, e.g., by slicing from bulk material or by molten glass float methods common to plate glass manufacture. Each such plate is ground flat in a step 32 to simplify later stacking and bonding operations. The thickness of each of the fused-silica flat plates is targeted to be no more than 0.25 millimeter. In a step 33, an adhesion layer of about 5,000 Å of chromium is deposited, e.g., by electron beam evaporation, onto the top and bottom surface of each of the fused-silica flat plates.

Since chromium oxidizes rapidly when exposed to air, a protective/bonding layer is needed to protect the chromium when the process vacuum is broken to allow a diffusion braze furnace to be used. Such a protective/bonding layer is unnecessary where the process vacuum can be maintained between deposition and diffusion bonding of multiple plates in a stack.

In a step 34, a protective/bonding layer of gold about 25,000 Å–35,000 Å thick is deposited on the chromium adhesion layer, to prohibit oxidation. An alloy of gold and chromium forms at the interface. Once the gold is deposited, the metallized plates can be exposed to air and transported to a diffusion braze furnace in a step 35. In a step 36, the metalized plates are aligned and stacked in a diffusion braze furnace. Steps 35 and 36 may be interchanged without effect. In a step 37, about one to two pounds per square inch of pressure is applied to the stack and the whole is heated to 900° C. for about two hours, enough to cause diffusion bonding. Such bonding between the metallized plates is preferably complete enough to allow the maintenance of a vacuum within the inner core of an assembled structure that uses the high gradient insulator as a vacuum envelope.

At this point, a laminate block of HGI material is realized. An ultrasonic abrasive drill is used in a step 38 to simultaneously hollow out the inside and carve the outside wall of a right cylinder. The cutting is preferably directed such that the layers of insulators and conductors thereafter lie in planes perpendicular to the central axis of the cylinder. Alternatively, machining the HGI block by lathing could be used for greater cylinder lengths.

The hollow cylinder structure that results can then be then used as an envelope for a vacuum tube device where the voltage gradients exceed 150 kV/cm (15 MV/m) between the anode and cathode. As such, a vacuum tube device only 2.5 cm long could have as much as 375 kV applied.

Other metals besides chromium and gold can be used. For example, erbium-erbium, erbium-silver, and erbium-gold metalizations are presently considered to be reasonable alternatives. Interlayer bonding agents could also be used.

In some tests, the chromium-gold combination has expressed malfunctions of the insulator that were caused by migration of metal ions in the silica. A chromium oxide ($Cr_2O_3$) forms at the interface of the silica and deposited chromium, and can generate defects if the fabrication process is not tightly controlled. One such defect has caused unbending of the insulator stack, and therefore could result in a loss of vacuum seal in the final applications.

Figure 4:
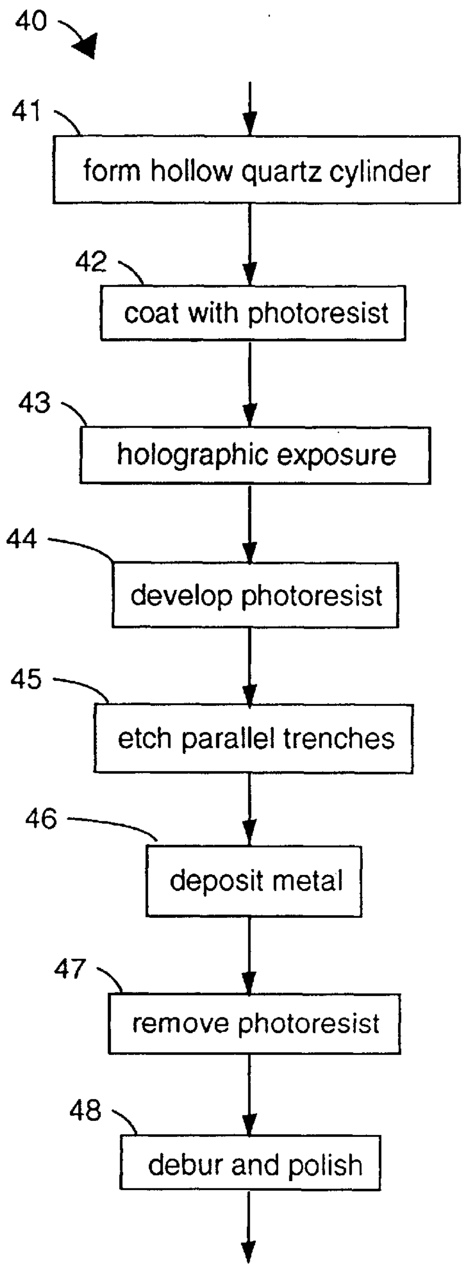
FIG. 4 is a flowchart of a method embodiment of the present invention for fabricating high gradient insulator structures such as that shown in FIGS. 2A–2B.

FIG. 4 is a flowchart of a method embodiment of the present invention for fabricating high gradient insulator structures such as that shown in FIGS. 2A–2B, and such method is referred to herein by the general reference numeral 40. The method 40 relies on the fact that to inhibit surface flashovers, the conductive layers do not need to penetrate very deeply into the insulator bulk. In fact, the metal rows can be inlaid in the surface. Therefore, semiconductor fabrication methods can be used to form systems of electrically isolated rings on the inside and outside surfaces of a hollow cylinder of quartz. Such rings preferably have a spacing period of 100–1000 μm, and so the width of each conductor on the surface needs to be under 50 μm.

The method 40 comprises a step 41 in which a dielectric substrate is formed. In this case, a hollow quartz cylinder for use as a vacuum tube envelope. In a step 42, the surfaces of the substrate are coated with conventional semiconductor processing type photoresist. In step 43 a holographic exposure is made, in which the changes in light amplitude resulting from a standing wave optical field caused by two locked-phase collimated laser beams is used to expose the photoresist in parallel lines or planes. The apparatus to do this is described further in connection with FIGS. 5–7. The exposed photoresist is developed in a step 44. A system of parallel surface trenches is then etched in the substrate where the photoresist is no longer bonded, in a step 45. In a step 46, a metal such as aluminum is deposited over the photoresist and etched trenches. The photoresist and any metal not deposited in a trench is removed in a step 47. In an optional step 48, the resulting surface with metal inlays is deburred and/or polished to eliminate rough surfaces that can act as field emitters. Various emission and resistive coatings may be further added to suppress surface flashovers.

Figure 5:
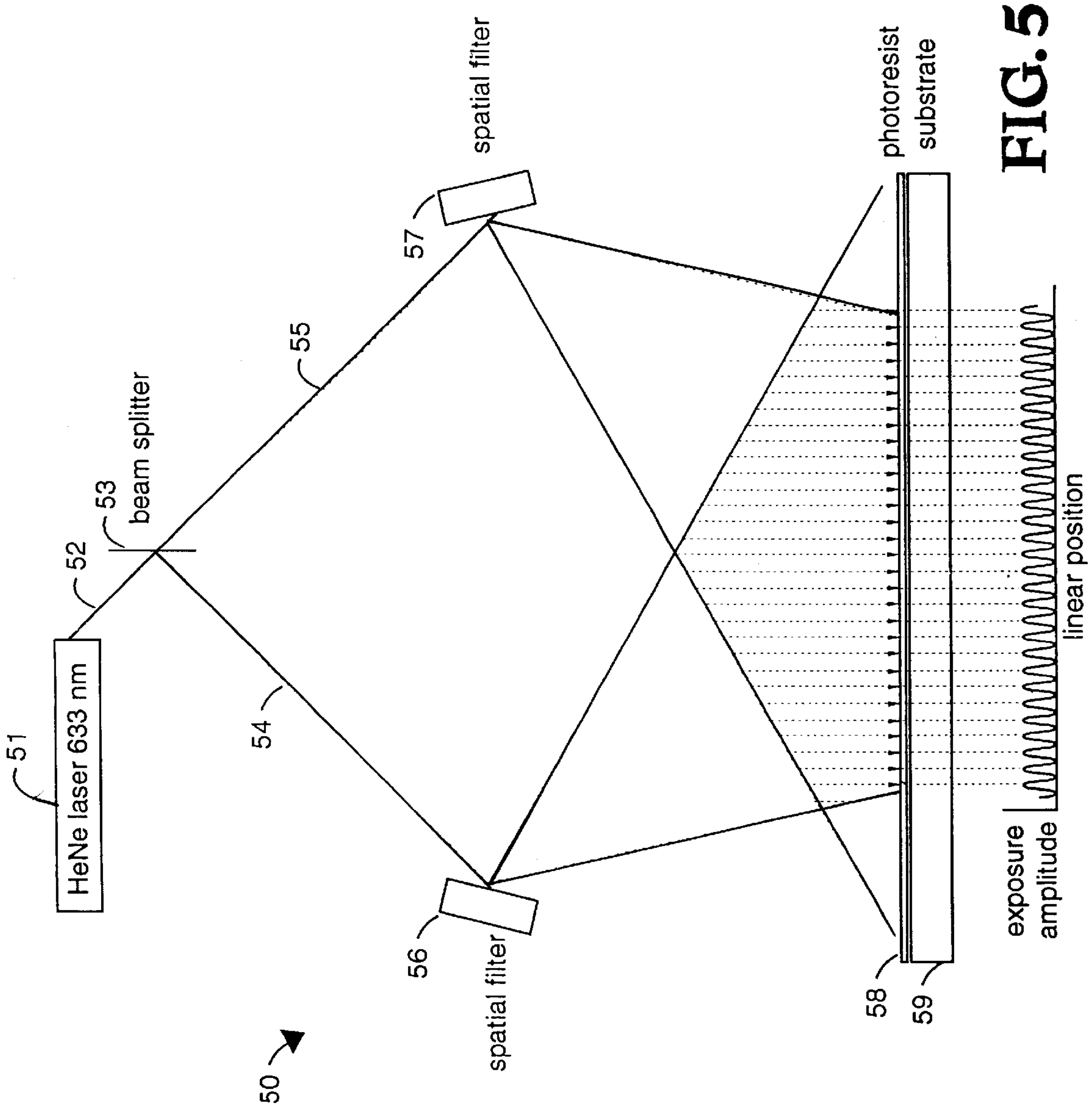
FIG. 5 is a schematic diagram of a holographic laser exposure apparatus useful in the method described by FIG. 4 and shows how the beam-split laser beams are combined to create a standing wave optical field that comprises a system of parallel planes of maximum intensity (beams constructively interfere) and minimum intensity (beams destructively interfere) that intersect a substrate coated with a photoresist.

FIG. 5 is a schematic diagram of a holographic laser exposure apparatus 50 that is useful in the method described by FIG. 4 and shows how the beam-split laser beams are combined to create a standing wave optical field that comprises a system of parallel planes of maximum intensity (beams add) and minimum intensity (beams subtract) that intersect a planar substrate coated with a photoresist. A long-coherence length laser 51, e.g., a helium-neon type operating monochromatically at 633 nm, produces a beam 52. A beam splitter 53 divides the laser energy into a pair of beams 54 and 55.

Figure 6:
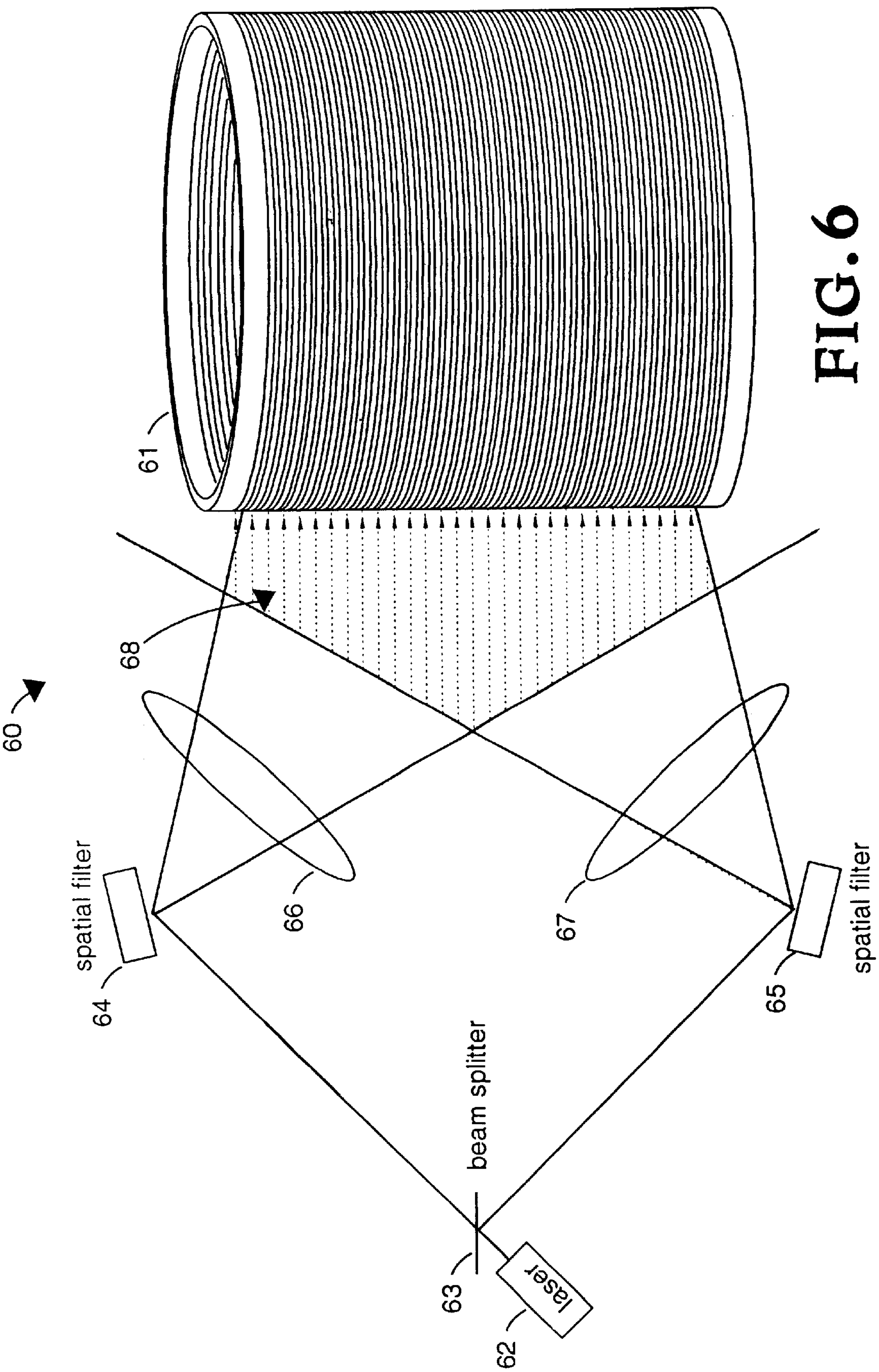
FIG. 6 is a schematic diagram of a holographic laser exposure apparatus useful in the method described by FIG. 4 to fabricate the transparent quartz glass high gradient insulator of FIGS. 2A and 2B, and shows how the beam-split laser beams are combined to create a standing wave optical field that comprises a system of parallel planes of maximum intensity (beams constructively interfere) and minimum intensity (beams destructively interfere) that intersect and pass through the whole cylindrical volume which has both its inner and outer surfaces coated with a translucent or transparent photoresist.

FIG. 6 shows a holographic laser exposure apparatus 60 also useful in the method described by FIG. 4 to fabricate a transparent quartz glass high gradient insulator 61, which is similar to that of FIGS. 2A and 2B. The holographic laser exposure apparatus 60 includes a long coherence length laser 62 directed at a beam-splitter 63. A pair of spatial filters 64 and 65 direct a pair of beam fans 66 and 67 to cross. The beam fans 66 and 67 constructively and destructively combine to create a standing wave optical field 68. A volume of parallel planes of maximum intensity (beams add) and minimum intensity (beams subtract) intersect and pass through the whole cylindrical volume of insulator 61 to expose a translucent or transparent photoresist which has been coated on both the inner and outer surfaces of insulator 61.

Figure 7:
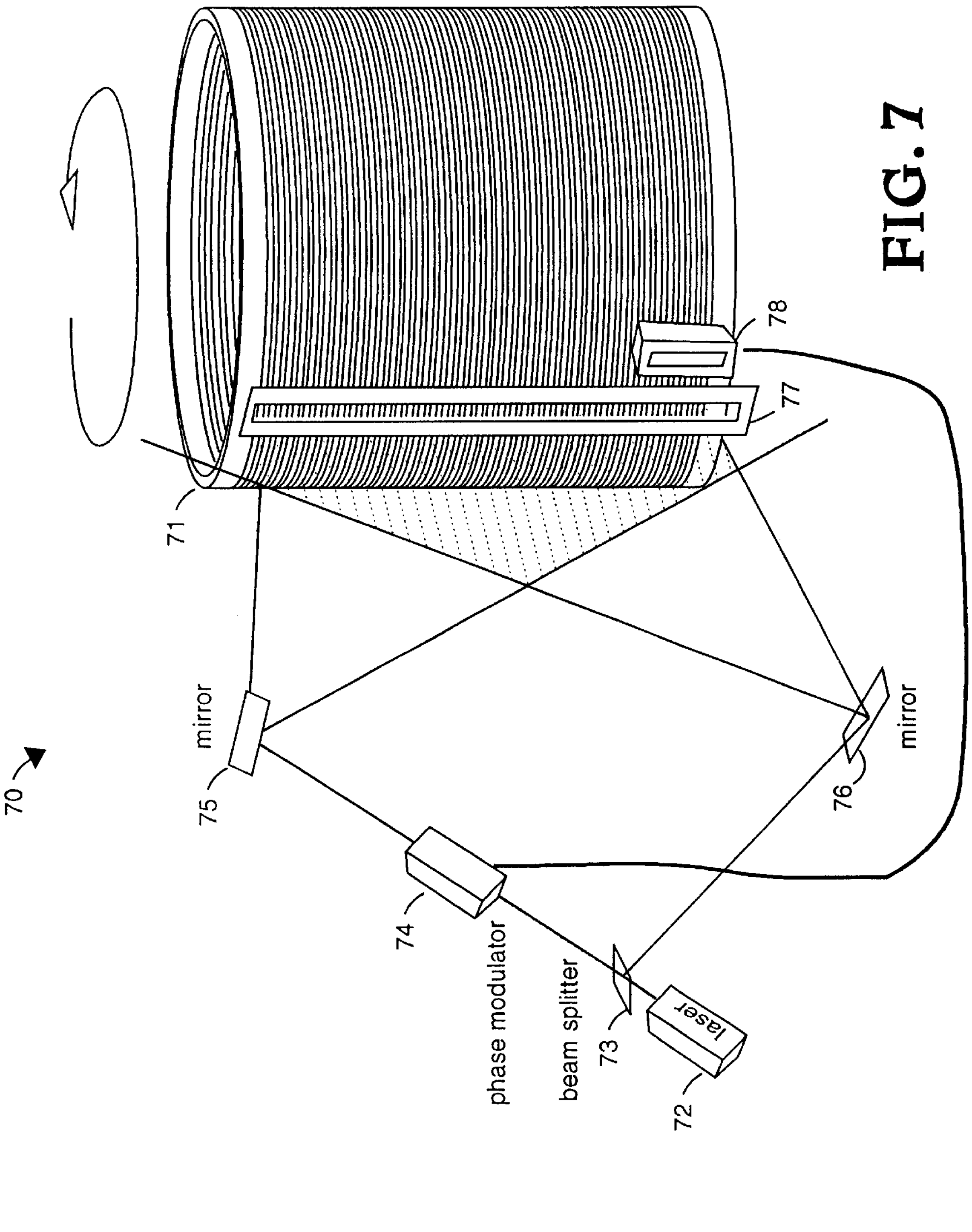
FIG. 7 is a schematic diagram of a holographic laser exposure apparatus useful in the method described by FIG. 4 to fabricate the high gradient insulator of FIGS. 2A and 2B, and shows how the beam-split laser beams are combined to create a standing wave optical field that comprises a system of parallel planes of maximum intensity (beams constructively interfere) and minimum intensity (beams destructively interfere) that are passed through a slit aperture to expose the photoresist coated on a rotating cylindrical high gradient insulator. As the distance between planes is reduced, a method termed "fringe locking" may be employed to lock the position of the interference fringes to the optic during exposure. A phase modulator in one arm of the interferometer will move the fringes by adjusting the phase and is controlled in a feedback loop by a sensor or two. A stylus type profil-o-meter contacting a flat end of the cylinder can sense the position of the optic and a Moire interferometer detects the fringe position by an aliased beat pattern produced between the standing waves and a secondary absorbing grating.

FIG. 7 shows a holographic laser exposure apparatus 70 also useful in the method described by FIG. 4 to fabricate a high gradient insulator 71, which is similar to that of FIGS. 2A and 2B. The holographic laser exposure apparatus 70 includes a long coherence length laser 72 directed at a beam-splitter 73. One of the beams split is then variable delayed by a phase modulator 74. A pair of spatial filters 75 and 76 direct a pair of beam fans to cross. The beam fans constructively and destructively combine to create a standing wave optical field that must squeeze through a slit 77. A one dimensional line of maximum intensity (beams add) and minimum intensity (beams subtract) points paint a longitudinal exposure line on the surface of insulator 61 to expose a translucent or transparent photoresist which has been coated on the outer surface. The whole surface is exposed by rotating the cylindrical insulator 71. A lateral effect diode 78, or other fringe position detector, is connected to the phase modulator 74 is a closed loop servo positioning control system to keep each of the circles planar which are painted around and on the surface of the cylinder as it is rotated. Alternatively, such a system can be used to shift the standing wave optical field by one whole longitudinal period each cylinder rotation so that a single spiral is formed after the whole 360° of the cylinder has been rotated through exposure through slit 77.

Figure 8A:
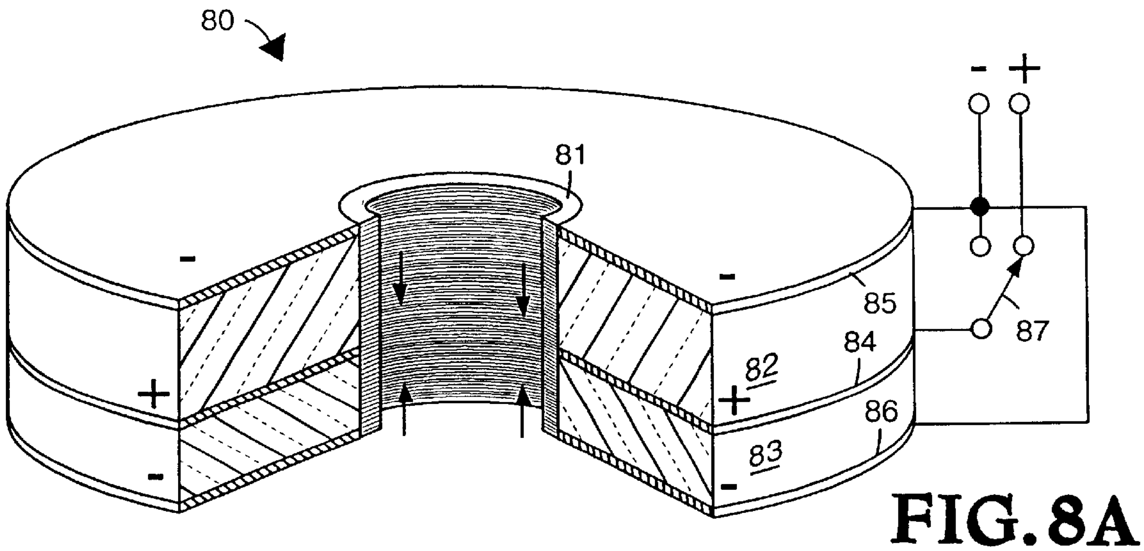
FIGS. 8A–8C are cutaway perspective views of a dielectric wall accelerator with an inner core sleeve of high gradient insulator material, and the various views represent different times in relation to the closing of a shorting switch.
Figure 8B:
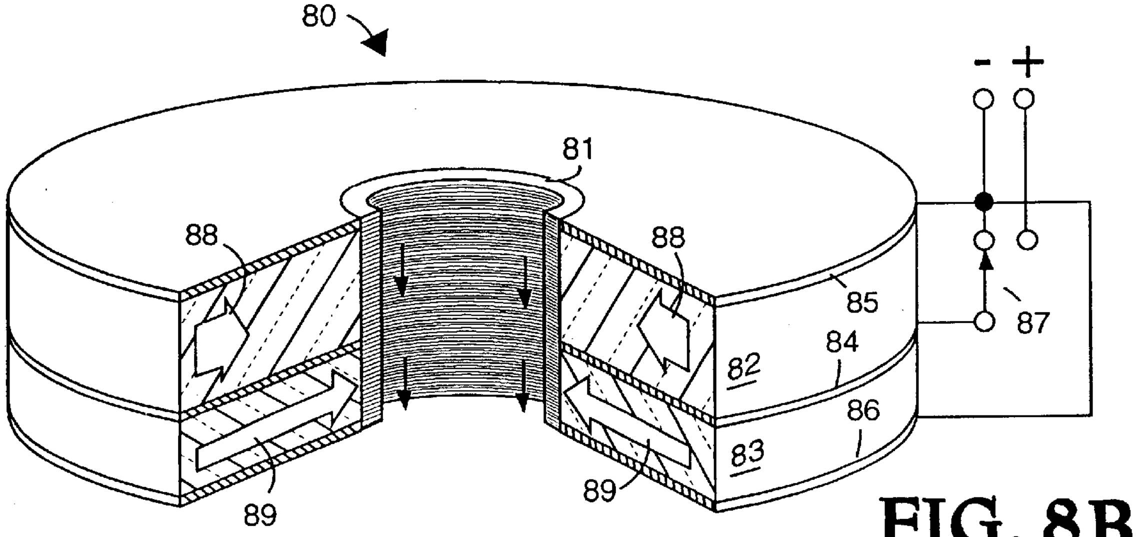
Figure 8C:
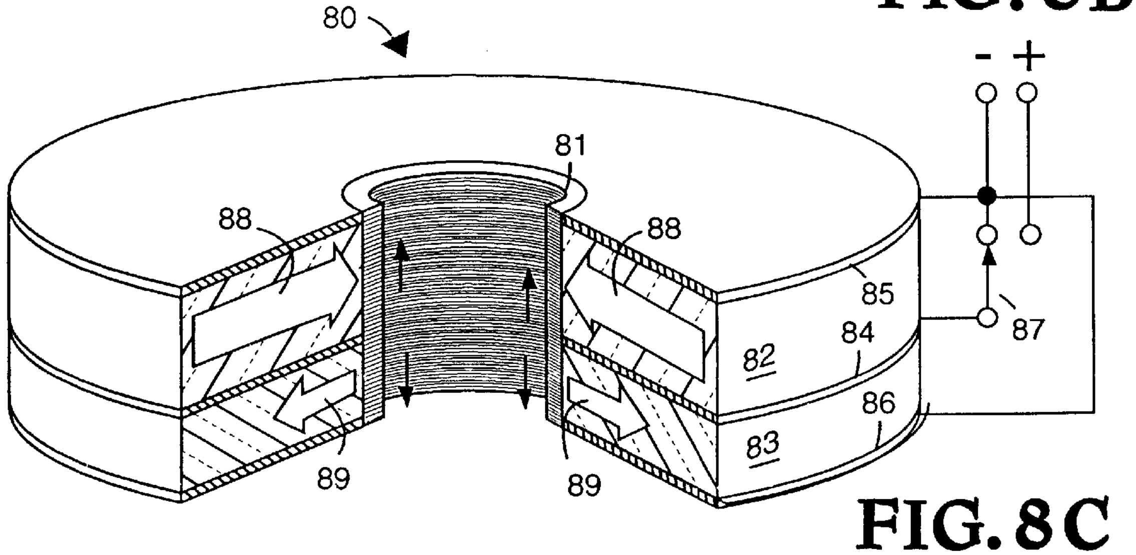

FIGS. 8A–8C are cutaway perspective views of a dielectric wall accelerator 80. For further information on the theory of operation and the construction of DWA 80 see U.S. Pat. No. 5,757,146 for "HIGH-GRADIENT COMPACT LINEAR ACCELERATOR", U.S. Pat. No. 5,821,705 for "IMPROVED DIELECTRIC-WALL LINEAR ACCELERATOR" and U.S. Pat. No. 5,811,944 "ENHANCED DIELECTRIC WALL ACCELERATOR". The DWA 80 critically includes an inner core sleeve 81 of high gradient insulator material, e.g., HGI 10 of FIG. 1 or HGI 20 of FIG. 2. A slow-line planar ring dielectric 82 and a fast-line planar ring dielectric 83 share a common electrode plate 84. The slow cell half is bounded by a ground electrode plate 85. The fast cell half is bounded by a ground electrode plate 86. A switch 87 is used to first charge the common electrode plate 84 (FIG. 8A), then to short it to ground (FIG. 8C). A slow pulse 88 and a fast pulse 89 race toward the sleeve 81 at the core. When the fast pulse 89 gets there, and it will be first, the electrostatic field flips around and aligns with that of the slow half. This is represented by the arrows in the core in FIG. 8B. The arrival of the slow pulse 88 at the core is represented in FIG. 8C and causes the electrostatic fields to revert to zero. During the time represent by FIG. 8B, charged particle will be axially accelerated in the core area.

The present inventors have experimentally observed that insulators composed of finely spaced alternating layers of dielectric (<1 mm) and thin metal sheets can substantially increase the vacuum surface flashover capability of a given insulator over insulators made from a single uniform substrate. A conclusive theory which fully explains this effect has yet to be presented. It is believed, however, that the increased breakdown electric field these structures exhibit may either separately or in combination, result from minimized secondary avalanche (SEEA) growth, shielding of the insulator from the effects of charging, or result from a modification of the statistical nature of the breakdown process by separating the structure into N−1 additional sub-structures. The present inventors have previously performed measurements and reported on small to moderate size insulator structures. In this previous work the present inventors have shown these structures to sustain electric fields 1.5 to 4 times that of a similar conventional single substrate insulator.

In addition, the present inventors previously reported on the capability of these structures under various pulse conditions, in the presence of a cathode and electron beam, and under the influence of intense optical illumination. In this paper the present inventors describe our on going studies investigating the degradation of the breakdown electric field resulting from alternate fabrication techniques, the effect of gas pressure, and the effect of the insulator to electrode interface gap spacing. Additionally, the present inventors have initiated testing which subject the insulator to the effect of energetic radiation fields. The present inventors also report on the progress in this latter area.

The present inventors have been pursuing the development of compact, high current (>2 kA), high gradient accelerator systems for various Department of Energy missions over the past several years. This work has mainly focused on a new high gradient, prompt pulse (order 10–50 ns) accelerator concept called the Dielectric Wall Accelerator (DWA). The pulsed electric field in this accelerator is developed by a series of asymmetric Blumleins incorporated into the insulator structure (FIGS. 8A–8C). When this structure is combined with a high gradient vacuum insulator embodiment of the present invention, short-pulse-high-gradients of greater than 20–30 MV/m may be possible.

The asymmetric Blumlein has two stacked pulse forming lines. Each has different transit times but equal impedance. In the ideal configuration, these Blumleins consist of alternating layers of two dissimilar dielectric materials with permitivities that preferably differ by 9:1. When the conductor in common with both lines is charged to potential, Vo, and shorted on the circumference of the accelerator structure, two reversed polarity wavefronts move at a velocity proportional to $e_r^{-0.5}$ toward the beam tube. For a fast pulse line length of time, t, and a slow pulse line length of time, 3 t, an energy gain of 2 Vo occurs across a single Blumlein structure into a matched beam load over the interval t to 3 t.

The maximum gradient of this accelerator is defined by the dielectric strength of the wall dielectrics and the maximum pulsed surface breakdown electric field capability of the interior vacuum interface in the acceleration region. Most dielectric materials can support the required gradients; the vacuum insulator structures generally do not. To maximize these gradients, the present inventors have undertaken an effort to improve the overall performance of vacuum insulators.

In addition to this particular accelerator application, other near term applications are being pursued. These include the proposed Advanced Hydrotest Linear Induction Accelerator (AHF-LIA) proposed by Lawrence Livermore National Laboratory and the Dual Axis Radiography Hydrotest (DARHT) Accelerator presently being built at Los Alamos National Laboratory. In these accelerators, high performance insulators will be required to optimize accelerator gap design for long pulses (of order 2 $\mu$S) on the AHF-LIA system and also for multi-pulse options being considered for the DARHT system.

A high gradient insulator consists of a series of very thin (<1 mm) stacked laminations interleaved with conductive planes. Experimental observations showed previous researchers that the threshold electric field for surface flashover increases with deceased insulator length. Later researchers achieved substantial increases in the breakdown threshold of these insulator structures over conventional, single substrate insulators. The present inventors have seen their embodiments to increase 1.5 to 4.0 times that over conventional insulator technology. The present inventors explored the properties of these structures in the context of switching applications, investigating their behavior under high fluence photon bombardment.

A certain amount of understanding of the increased breakdown threshold of these structures can be realized from a basic surface flashover model. The most simplified vacuum surface breakdown model suggests that electrons originating from the cathode insulator junction are responsible for initiating the failure. When these electrons are intercepted by the insulator, additional electrons, based on the secondary emission coefficient of the surface, are liberated. This effect leaves a net positive charge on the insulator surface, attracting more electrons and leading to escalation of the effect or the so-called secondary electron emission avalanche breakdown (SEEA). It has been shown that full evolution of the discharge occurs within 0.5 mm. Thus, placing slightly protruding metallic structures spaced at an equivalent interval is believed to interrupt the SEEA process and allow the insulator to achieve higher gradients before failure. Alternate modifications to this explanation include the effects of insulator shielding and equilibration of the induced surface charge. As a result, electron impact on the surface is modified. Or, alternately, by separation of the insulator into N−1 additional decoupled sub-structures, a local breakdown on the insulator cannot propagate to the remainder of the structure.

The present inventors have studied the effects of various fabrication techniques, gas pressures, and insulator to electrode interface spacing. The insulator was also subjected to energetic radiation fields.

Small sample testing (approximately 2.5 cm diameter by 0.5 cm thick) was performed in a turbo-molecular pumped, stainless-steel chamber at approximately $10^{-6}$ T. High voltage was developed with a 10 J "mini-Marx". The Marx developed a pulsed voltage of approximately one to ten microseconds (base-to-base), and up to 250 kV amplitude across the sample. Diagnostics consisted of an electric field sensor and a current viewing resistor. Failure of the insulator was determined by a prompt increase in Marx current and a prompt collapse in the voltage across the sample.

Several small sample insulators were fabricated. These samples were fabricated by interleaving layers of 0.25 mm fused silica. The interleaved metallic layers were formed by depositing gold on each planar insulator surface by a sputtering technique and then bonding the stacked layers by heating while applying pressure. Bond strength between the gold layer and substrate using this technique was measured to exceed 10 kpsi. To perform the breakdown experiments, the structure was slightly compressed between highly polished bare aluminum electrodes which establish the electric field for the tests.

To obtain a particular data set, the insulators were subjected to several low voltage conditioning pulses. The voltage was then increased a small amount incrementally until breakdown occurred. Voltage was then reduced for several shots and then incrementally increased again until a constant value was achieved. In these experiments, however, the present inventors generally observed that these insulators did not condition. Once a breakdown occurred at a particular field, reducing the voltage slightly and increasing it again did not cause an increase in breakdown field.

To produce a given data set the present inventors would apply up to 150–200 shots to a given structure and would attempt to determine if any damage to the structure occurred which significantly altered the breakdown characteristics. At these applied energies, the present inventors generally did not observe any degradation. These data were then reduced to reliability plots by determining the total number of successful shots over the total number of applied shots. In these data the present inventors define the electric field as the applied voltage divided by the total insulator length. The present inventors defined reliability at a given electric field as the total number of successful shots over the total number of shots.

Flashovers occurred at approximately 175 kV/cm for these fused silica substrates. The effect of pulse width from 1–10 $\mu$S on this breakdown threshold was well within the statistical nature of our data. The trend in conventional insulator technology for 00 insulators indicates a breakdown threshold of approximately 50 kV/cm. Thus, there was a net increase in the performance with these insulators over conventional technology of approximately 3.5.

To ensure concentricity on these first structures, a finish grinding operation was performed on the outside diameter. This process is a time consuming second operation and an alternate fabrication means was pursued. To simplify fabrication the present inventors attempted an ultrasonic machining process. Although it was possible to fabricate the part in a single operation, the surface was left slightly rougher. Comparison of the breakdown characteristics of these samples showed significantly more scatter and on average a slightly decreased breakdown threshold of approximately 25%.

Any insulator not in full contact with the electrode surface will show a higher susceptibility to breakdown and lower reliability at a given electric field. This effect results from the enhanced electric field that occurs between the insulator/electrode interface gap. To investigate this effect with these new structures, shims were placed between the cathode electrode and insulator and the reliability at a given electric field were determined. In tests, the present inventors observed the reduction in the capability of the insulator to be strongly reduced from about 90% (of full capability for a 12 $\mu$m interface gap to less than 60% for a 125 $\mu$m interface gap.

The present inventors have also begun testing these structures in the presence of an ion beam and various other radiation fields. In this test, the present inventors utilized a high current pulsed ion source. The ions are allowed to impinge on the structures near the cathode triple junction while a high potential is applied across the sample. Our observations to date are somewhat qualitative and indicate that the ion beam does not induce an immediate and prompt breakdown on impact. Rather, the present inventors only observe a somewhat reduced breakdown electric field capability resulting from direct ion impact on the insulator surface.

In another embodiment of the present invention, the insulator consists of finely spaced metal electrodes interleaved with the insulator substrate. The spacings of these metal electrodes is on the order of a streamer formation distance. In these tests, the present inventors observe up to a factor of 3.5 improvement over conventional straight wall (0°) insulators. Slanted walls have also shown further resistance to surface flashover. The susceptibility of these insulators to breakdown has been tested under various conditions. These conditions include the effect of surface roughness resulting from different fabrication techniques, the effect of gas pressure, and the effect of the insulator to electrode interface spacing. Such structures have been tested in the presence of an ion beam and various other radiation fields. The observations to date are still somewhat qualitative, but indicate that the ion beam does not induce a immediate and prompt breakdown on impact. Rather, the present inventors observe a somewhat reduced breakdown electric field on the structure.

Although particular embodiments of the present invention have been described and illustrated, such is not intended to limit the invention. Modifications and changes will no doubt become apparent to those skilled in the art, and it is intended that the invention only be limited by the scope of the appended claims.

What is claimed is:

1. A method for building hollow insulator cylinders that can have each end closed off with a high voltage electrode to contain a vacuum, comprising:

fabricating a series of fused-silica round flat plates with a central hole and equal inside and outside diameters;

depositing a metal layer onto each top and bottom surface of the fused-silica round flat plates;

aligning and stacking the coated plates; and heating or pressing said stack enough to cause the metal layers to bond, wherein such bonding is complete enough to maintain a vacuum within the assembled structure.

2. The method of claim 1 wherein:

the step of depositing a metal layer onto each top and bottom surface includes the use of eutectic metals and one alloy constituent is deposited on the tip of each fused-silica round flat plate and another alloy constituent is deposited on the bottom.

3. The method of claim 1, further comprising:

diffusing said layer after the metal deposition step deep into each fused-silica round flat plate.

4. A method for fabricating vacuum insulators with extended vacuum surface flashover thresholds, comprising the steps of:

forming a multiplicity of flat thin plates from a bulk solid material which is used as a bulk solid electrical insulator in common practice;

depositing an adherent conductive metal layer or combination of metal layers to each of the two sides of each plate, wherein a capacitor is formed by said conductive layers separated by said plate of bulk solid material;

stacking and aligning said multiplicity of plates having said conductive layers; and applying sufficient heat and pressure for a sufficient length of time to cause the metal layers to bond together creating a single sealed assembly.

5. The method of claim 4 for fabricating vacuum insulators with extended vacuum surface flashover thresholds, wherein said bulk solid material is selected from a group consisting of quartz, silica glass, alumina and sapphire bulk insulator material.

6. The method of claim 4 for fabricating vacuum insulators with extended vacuum surface flashover thresholds, wherein said step of depositing an adherent conductive metal layer or combination of metal layers comprises first depositing an adherent conductive metal layer of chromium or erbium; and then depositing a protective/bonding layer of erbium, gold or silver.

7. A method of claim 4 for fabricating vacuum insulators with extended vacuum surface flashover thresholds, further comprising, after the step of forming a number of flat thin plates from a bulk solid material, the step of:

flattening each of said plates.

8. A method of claim 4 for fabricating vacuum insulators with extended vacuum surface flashover thresholds, wherein the step of depositing an adherent conductive metal layer or combination of metal layers to each of the two sides of each plate, comprises:

depositing one or more adherent conductive metal layers to both sides of the plates, the final layer deposited on a first side being of a first conductive metal and the final layer deposited on the second side being of a second conductive metal; and the step of stacking and aligning comprises:

stacking and aligning said plates alternating orientation of the plates such that said layers of the first and second metals on the surfaces of adjacent plates are in intimate contact.

9. A method for fabricating vacuum insulators with extended vacuum surface flashover thresholds, comprising the steps of:

forming a number of flat thin plates from a bulk solid material which is used as a bulk solid electrical insulator in common practice;

flattening each said plate to simplify later stacking and bonding operations;

depositing one of more adherent conductive metal layers to both faces of the plates, a first half of the plates having a final layer deposited of a first conductive metal and a second half of the plates having the final layer of a second conductive metal;

stacking and aligning said plates so that surfaces of adjacent plates having final layers of different metals are in intimate contact;

applying sufficient heat and pressure for a sufficient length of time to cause the final layers of different metals to form a bond creating a single sealed assembly.

10. The method of claim 9 for fabricating vacuum insulators with extended vacuum surface flashover thresholds, wherein said bulk solid material is selected from a group consisting of quartz, silica glass, alumina and sapphire bulk insulator material.

11. The method of claim 1 wherein said fused-silica round flat plates are 0.25 mm or less in thickness.

12. The method of claim 4 wherein said flat thin plates are 0.25 mm or less in thickness.

13. The method of claim 9 wherein said flat thin plates are 0.25 mm or less.

* * * * *